United States Patent [19]

Yoshida et al.

[11] Patent Number: 5,589,432
[45] Date of Patent: Dec. 31, 1996

[54] EXHAUST GAS CLEANER AND METHOD FOR CLEANING SAME

[75] Inventors: Kiyohide Yoshida; Gyo Muramatsu; Akira Abe; Naoko Irite, all of Kumagaya, Japan

[73] Assignee: Kabushiki Kaisha Riken, Tokyo, Japan

[21] Appl. No.: 434,915

[22] Filed: May 4, 1995

Related U.S. Application Data

[62] Division of Ser. No. 171,679, Dec. 22, 1993, abandoned.

[30] Foreign Application Priority Data

| Dec. 28, 1992 | [JP] | Japan | 4-360377 |
| Feb. 15, 1993 | [JP] | Japan | 5-48613 |
| May 10, 1993 | [JP] | Japan | 5-132581 |
| May 12, 1993 | [JP] | Japan | 5-133954 |
| May 26, 1993 | [JP] | Japan | 5-146917 |
| Jul. 20, 1993 | [JP] | Japan | 5-200391 |

[51] Int. Cl.$^6$ ............... B01J 23/72; B01J 8/02; C01B 21/00

[52] U.S. Cl. ............ 502/325; 502/330; 502/331; 502/332; 502/338; 502/344; 502/345; 502/349; 502/350; 423/239.1; 423/213.2; 423/213.5; 423/213.7

[58] Field of Search ............ 502/325, 330, 502/331, 332, 338, 344, 345, 349, 350; 423/239.1, 213.2, 213.5, 213.7

[56] References Cited

U.S. PATENT DOCUMENTS

| 3,867,508 | 2/1975 | Hass | 423/213.7 |
| 5,075,274 | 12/1991 | Kiyohide et al. | 502/303 |
| 5,208,198 | 5/1993 | Nakano et al. | 502/74 |
| 5,208,205 | 5/1993 | Subramanian et al. | 522/333 |

FOREIGN PATENT DOCUMENTS

| 0362960 | 4/1990 | European Pat. Off. |
| 0498325 | 8/1992 | European Pat. Off. |
| 0577438 | 1/1994 | European Pat. Off. |
| 4008371 | 9/1990 | Germany |
| 63-100919 | 5/1988 | Japan |
| 63-283727 | 11/1988 | Japan |
| 1130735 | 5/1989 | Japan |
| 4281844 | 10/1992 | Japan |
| 2248194 | 4/1992 | United Kingdom |
| 9209848 | 6/1992 | WIPO |

OTHER PUBLICATIONS

Hawley, The Condensed Chemical Dictionary, 10th Ed., p. 740, 1981.

Translation of JP '844 reference.

*Primary Examiner*—Thurman K. Page
*Assistant Examiner*—Kathryne E. Shelborne
*Attorney, Agent, or Firm*—Browdy and Neimark

[57] ABSTRACT

Nitrogen oxides are efficiently removed from an exhaust gas containing nitrogen oxides and an excess amount of oxygen, by (i) disposing an exhaust gas cleaner in a flow path of the exhaust gas, the exhaust gas cleaner comprising a first catalyst comprising 0.2–15 weight % (on a metal basis) of silver or silver oxide supported on a porous inorganic oxide on the inlet side and a second catalyst comprising 0.2–15 weight % (on a metal basis) of silver or silver oxide and 2 weight % or less (on a metal basis) of copper or copper oxide supported on a porous inorganic oxide on the outlet side; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–600° C.

12 Claims, 6 Drawing Sheets

EXHAUST GAS CLEANER AND METHOD FOR CLEANING SAME

This is a division of parent application Ser. No. 08/171,679 filed Dec. 22, 1993, now abandoned.

BACKGROUND OF THE INVENTION

The present invention relates to an exhaust gas cleaner for effectively removing nitrogen oxides by reduction and optionally carbon monoxide and hydrocarbons by oxidation from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" means nitrogen monoxide and/or nitrogen dioxide.

The nitrogen oxides are one causes of acid rain, posing a serious problem of environmental pollution. For these reasons, various methods have been proposed to remove nitrogen oxides from exhaust gases emitted from combustion equipment.

In the case of large, stationary combustion apparatuses such as large combustion apparatuses of factories, ammonia is introduced into an exhaust gas, whereby nitrogen oxides in the exhaust gas are catalytically and selectively reduced.

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen, carbon monoxide or hydrocarbons in the absence of a catalyst. However, since a catalyst is not used in this method, the reducing agent should be added in a larger amount than its stoichiometric amount relative to oxygen in the exhaust gas to carry out effective removal of NOx. Accordingly, this non-catalytic method is effective only for exhaust gas having a relatively low oxygen concentration, which is generated by burning nearly at a theoretical air-fuel ratio.

There have been proposed methods of reducing nitrogen oxides by adding to an exhaust gas hydrocarbons in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735; Thesis 2A526, 1990, the 59th Spring Conference of the Japan Chemical Society; Theses 3L420, 3L422 and 3L423, 1990, the 60th Fall Conference of the Japan Chemical Society; and "Catalyst", Vol. 33, No. 2, p.59 (1991)).

However, these methods are effective only in a narrow temperature range of NOx removal. Also, their efficiency of removing nitrogen oxides is extremely low in the case of an actual exhaust gas because it contains about 10% of moisture.

In addition, though it is important to remove unburned components such as carbon monoxide, hydrocarbons, etc. from an exhaust gas, there has not been proposed a method capable of efficiently removing them together with nitrogen oxides from the exhaust gas.

OBJECT AND SUMMARY OF THE INVENTION

Accordingly, an object of the present invention is to provide an exhaust gas cleaner and a method capable of efficiently removing nitrogen oxides from an exhaust gas containing nitrogen oxides and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

Another object of the present invention is to provide an exhaust gas cleaner and a method capable of efficiently removing nitrogen oxides by reduction and carbon monoxide and hydrocarbons by oxidation from an exhaust gas containing nitrogen oxides, unburned components such as carbon monoxide, hydrogen, hydrocarbons, etc., and oxygen in an amount larger than the stoichiometric amount relative to the unburned components, such an exhaust gas being discharged from stationary combustion apparatuses, gasoline engines operated under oxygen excess conditions, and diesel engines.

As a result off intense research in view of the above objects, the inventors have found that nitrogen oxides are effectively removed even from an exhaust gas containing about 10% of moisture with improved efficiency in a wide temperature range, by using an exhaust gas cleaner comprising silver or silver oxide supported on a porous inorganic oxide and Cu, Pt, Au, etc. supported on a porous inorganic oxide, and by adding hydrocarbons and/or oxygen-containing organic compounds to the exhaust gas and bringing the exhaust gas into contact with the exhaust gas cleaner in a particular temperature range. The inventors have further found that nitrogen oxides, carbon monoxide and hydrocarbons are effectively removed even from an exhaust gas containing about 10% of moisture with improved efficiency in a wide temperature range by using an exhaust gas cleaner comprising silver or silver oxide supported on a porous inorganic oxide, copper or copper oxide supported on a porous inorganic oxide, and Pt, etc. supported on a porous inorganic oxide, and by adding hydrocarbons and/or oxygen-containing organic compounds to the exhaust gas and bringing the exhaust gas into contact with the exhaust gas cleaner in a particular temperature range. The present invention has been completed based on these findings.

Thus, the first exhaust gas cleaner for removing nitrogen oxides from an exhaust gas containing nitrogen oxides and oxygen in an amount larger than its stoichiometric amount relative to unburned components in the exhaust gas according to the present invention comprises a first catalyst on the inlet side of the exhaust gas cleaner and a second catalyst on the outlet side of the exhaust gas cleaner, the first catalyst comprising 0.2–15 weight % (on a metal basis) of silver or silver oxide supported on a porous inorganic oxide, and the second catalyst comprising (a) 0.2–15 weight % (on a metal basis) of silver or silver oxide and (b) 2 weight % or less (on a metal basis) of copper or copper oxide supported on a porous inorganic oxide.

The first method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising a first catalyst on the inlet side of the exhaust gas cleaner and a second catalyst on the outlet side of the exhaust gas cleaner, the first catalyst comprising 0.2–15 weight % (on a metal basis) of silver or silver oxide supported on a porous inorganic oxide, and the second catalyst comprising (a) 0.2–15 weight % (on a metal basis) of silver or silver oxide and (b) 2 weight % or less (on a metal basis) of copper or copper oxide supported on a porous inorganic oxide; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–600° C., thereby causing a reaction of the nitrogen oxides with the hydrocarbons and/or the oxygen-containing organic compounds to remove the nitrogen oxides.

The second method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising a first catalyst on the inlet side of the exhaust gas cleaner and a second catalyst on the outlet side of the exhaust gas cleaner, the first catalyst comprising 0.2–15 weight % (on a metal basis) of silver or silver oxide supported on a porous inorganic oxide, and the second catalyst comprising (a) 0.2–15 weight % (on a metal basis) of silver or silver oxide and (b) 2 weight % or less (on a metal basis) of copper or copper oxide supported on a porous inorganic oxide; and (ii) bringing the exhaust gas into contact with the catalyst at a temperature of 200°–600° C., thereby causing a reaction between the nitrogen oxides and hydrocarbons remaining in the exhaust gas to remove the nitrogen oxides.

The second exhaust gas cleaner for cleaning an exhaust gas containing nitrogen oxides, unburned components comprising carbon monoxide and hydrocarbons, and oxygen in an amount larger than its stoichiometric amount relative to the unburned components, by removing nitrogen oxides by reduction and carbon monoxide and hydrocarbons by oxidation from the exhaust gas according to the present invention comprises first, second and third catalysts in this order from the inlet side to the outlet side of the exhaust gas cleaner, the first catalyst comprising 0.2–15 weight % (on a metal basis) of silver or silver oxide supported on a porous inorganic oxide, the second catalyst comprising 0.2–15 weight % (on a metal basis) of silver or silver oxide and 2 weight % or less (on a metal basis) of copper or copper oxide supported on a porous inorganic oxide, and the third catalyst comprising 2 weight % or less (on a metal basis) of at last one element selected from the group consisting of Pt, Pd, Ru, Rh, Ir and Au supported on a porous inorganic oxide.

The third method for cleaning an exhaust gas containing nitrogen oxides, unburned components comprising carbon monoxide and hydrocarbons, and oxygen in an amount larger than its stoichiometric amount relative to the unburned components, by removing nitrogen oxides by reduction and carbon monoxide and hydrocarbons by oxidation from the exhaust gas according to the present invention comprises (i) disposing an exhaust gas cleaner in a flow path of the exhaust gas, the exhaust gas cleaner comprising first, second and third catalysts in this order from the inlet side to the outlet side of the exhaust gas cleaner, the first catalyst comprising 0.2–15 weight % (on a metal basis) of silver or silver oxide supported on a porous inorganic oxide, the second catalyst comprising 0.2–15 weight % (on a metal basis) of silver or silver oxide and 2 weight % or less (on a metal basis) of copper or copper oxide supported on a porous inorganic oxide, and the third catalyst comprising 2 weight % or less (on a metal basis) of at least one element selected from the group consisting of Pt, Pd, Ru, Rh, Ir and Au supported on a porous inorganic oxide; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–600° C., thereby causing a reaction of the nitrogen oxides with the hydrocarbons and/or oxygen-containing organic compounds to remove nitrogen oxides, carbon monoxide and hydrocarbons.

The third exhaust gas cleaner for removing nitrogen oxides from an exhaust gas containing nitrogen oxides and oxygen in an amount larger than its stoichiometric amount relative to unburned components in the exhaust gas according to the present invention comprises a first catalyst comprising 0.2–15 weight % (on a metal basis) of silver or silver oxide having an average diameter of 10–1000 nm and supported on a porous inorganic oxide, and a third catalyst comprising 0.02–5 weight % (on a metal basis) of at least one element selected from the group consisting of Pt, Pd, Ru, Rh, Ir and Au supported on a porous inorganic oxide.

The fourth method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising a first catalyst comprising 0.2–15 weight % (on a metal basis) of silver or silver oxide having an average diameter of 10–1000 nm and supported on a porous inorganic oxide, and a third catalyst comprising 0.02–5 weight % (on a metal basis) of at least one element selected from the group consisting of Pt, Pd, Ru, Rh, Ir and Au supported on a porous inorganic oxide; (ii) introducing hydrocarbons and/or oxygen-containing organic compounds into the exhaust gas on the upstream side of the exhaust gas cleaner; and (iii) bringing the exhaust gas into contact with the exhaust gas cleaner at a temperature of 200°–650° C., thereby causing a reaction of the nitrogen oxides with the hydrocarbons to remove the nitrogen oxides.

The fifth method for removing nitrogen oxides from an exhaust gas discharged from engines operated by using as a fuel mixed hydrocarbons of liquefied petroleum gas, town gas or liquefied natural gas, the exhaust gas containing nitrogen oxides and oxygen in an amount larger than its stoichiometric amount relative to unburned components in the exhaust gas according to the present invention comprises the steps of:

(i) disposing an exhaust gas cleaner in a flow path of the exhaust gas, the exhaust gas cleaner comprising a first catalyst on the inlet side and a third catalyst on the outlet side, the first catalyst comprising 0.2–15 weight % (on a metal basis) of silver or silver oxide supported on a porous inorganic oxide, and the third catalyst comprising 0.01–5 weight % (on a metal basis) of at least one element selected from the group consisting of Pt, Pd, Ru, Rh, Ir and Au supported on a porous inorganic oxide;

(ii) introducing at least one hydrocarbon selected from the group consisting of liquefied petroleum gas, town gas, liquefied natural gas, methane and ethane in an amount five times or less that of nitrogen oxides in the exhaust gas into the exhaust gas on the upstream side of the exhaust gas cleaner; and (iii) bringing the exhaust gas into contact with the exhaust gas cleaner at a temperature of 200°–650° C., thereby causing a reaction of the nitrogen oxides with the hydrocarbon to remove the nitrogen oxides.

DETAILED DESCRIPTION OF THE INVENTION

The present invention provides the following types of exhaust gas cleaners and the corresponding methods for removing nitrogen oxides:

[A]
First catalyst: silver or silver oxide, and
Second catalyst: silver or silver oxide and copper or copper oxide.

[B]
First catalyst: silver or silver oxide,
Second catalyst: silver or silver oxide and copper or copper oxide, and
Third catalyst: Pt, Au, etc.

[C]
First catalyst: silver or silver oxide, and
Third catalyst: Pt, Au, etc.

The nitrogen oxides are removed from an exhaust gas by bringing the exhaust gas into contact with the above exhaust gas cleaner, and by using hydrocarbons remaining in the exhaust gas and/or hydrocarbons and/or oxygen-containing organic compounds added to the exhaust gas on the upstream side of the exhaust gas cleaner as reducing agents.

Each exhaust gas cleaner may be basically one of two structures; one in which each of two or more catalysts is composed of a catalytically active component carried by porous inorganic oxide powder, which is in turn supported on an exhaust gas cleaner substrate, and the other in which each of two or more catalysts is composed of a catalytically active component directly carried by a porous inorganic oxide body.

In the former exhaust gas cleaner, the catalysts comprising catalytically active components supported on a porous inorganic oxide powder are coated onto a heat-resistant exhaust gas cleaner substrate. Preferable materials for the exhaust gas cleaner substrate include porous, heat-resistant ceramics such as γ-alumina, titania, zirconia and their composite oxides such as γ-alumina-titania, γ-alumina-silica, γ-alumina-zirconia, titania-zirconia, etc. When a high heat resistance is required, cordierite, mullite, alumina or its composite oxides are preferable. Also, the exhaust gas cleaner substrate may be formed from a known metal material.

The shape and size of the exhaust gas cleaner substrate may be changed depending on applications. Practically, it is preferable to form the exhaust gas cleaner substrate by a combination of two parts or more. Specifically, in the case of two parts, there are an inlet portion and an outlet portion. Also, in the case of three parts, there are an inlet portion, an intermediate portion and an outlet portion. The exhaust gas cleaner substrate may be in the form of a three-dimensional structure such as a honeycomb, a foam, a refractory fiber assembly, etc.

In the latter exhaust gas cleaner, the catalytically active components are supported directly by porous inorganic oxide bodies in the form of pellets or granules, and they are charged into a proper reactor such as a catalytic converter.

[A] First type of exhaust gas cleaner and method of removing NOx by using such exhaust gas cleaner The first type of exhaust gas cleaner comprises a first catalyst comprising 0.2–15 weight % (on a metal basis) of silver or silver oxide supported on a porous inorganic oxide, and a second catalyst comprising (a) 0.2–15 weight % (on a metal basis) of silver or silver oxide and (b) 2 weight % or less (on a metal basis) of copper or copper oxide supported on a porous inorganic oxide. The first catalyst is disposed on the inlet side of the exhaust gas cleaner, and the second catalyst is disposed on the outlet side of the exhaust gas cleaner.

[1] First catalyst

The first catalyst is silver or silver oxide supported on a porous inorganic oxide, which is disposed on the inlet side of the exhaust gas cleaner. Preferable materials for the porous inorganic oxide include ceramics such as alumina, silica, titania, zirconia and their composite oxides, etc. Particularly preferable materials for the porous inorganic oxide are γ-alumina or its composite oxide such as γ-alumina-titania, γ-alumina-silica, γ-alumina-zirconia, etc. With γ-alumina or its composite oxides, the hydrocarbons remaining in the exhaust gas and/or the hydrocarbons and/or oxygen-containing organic compounds added to the exhaust gas are efficiently reacted with the nitrogen oxides in the exhaust gas.

A specific surface area of the porous inorganic oxide is preferably 10 m$^2$/g or more. When the specific surface area is smaller than 10 m$^2$/g, the catalytically active component supported on a porous inorganic oxide does not come into contact with the exhaust gas in a large contact area, and fails to remove nitrogen oxides efficiently. A specific surface area of the porous inorganic oxide is more preferably 30 m$^2$/g or more.

The amount of silver or silver oxide supported as a catalytically active component by the porous inorganic oxide is 0.2–15 weight % (on a metal basis) based on the porous inorganic oxide (100 weight %). When the amount of silver or silver oxide is less than 0.2 weight %, the removal ratio of nitrogen oxides is low. On the other hand, when the amount of silver or silver oxide is more than 15 weight %, hydrocarbons are likely to be predominantly burned, resulting in a decrease in the removal ratio of nitrogen oxides. The preferred amount of silver or silver oxide is 0.5–10 weight % (on a metal basis) based on the porous inorganic oxide.

The silver component (silver or silver oxide) is preferably in the form of fine powder having an average diameter of 10–1000 nm. The smaller the average diameter of the silver component, the higher the reactivity of the first catalyst. When the average diameter of the silver component is less than 10 nm, hydrocarbons and/or oxygen-containing organic compounds are likely to be predominantly burned, resulting in a decrease in the removal ratio of nitrogen oxides. On the other hand, when it is larger than 1000 nm, the reactivity of the silver component is low, resulting in a low removal ratio of nitrogen oxides. The average diameter of the silver component is preferably 10–500 nm, and most preferably 10–200 nm. Incidentally, the average diameter is determined arithmetically. The fine silver component particles may exist in the form of a metal or an oxide at the exhaust gas temperature, though they are silver oxide on particle surfaces.

The silver component may be deposited onto by the porous inorganic oxide by known methods such as an impregnation method, a precipitation method, etc. In the case of the impregnation method, the porous inorganic oxide is impregnated with an aqueous solution of silver nitrate, etc., dried at 50°–150° C., and heated at a temperature elevating stepwise from about 100° C. to about 600° C. The heating may be conducted in the air, in an oxygen or nitrogen atmosphere, or in a hydrogen stream. When the heating is conducted in a nitrogen atmosphere or in a hydrogen stream, it is preferable to finally conduct an oxidation treatment, more preferably in the presence of a small amount of nitrogen oxide.

The thickness of the first catalyst carried by the exhaust gas cleaner substrate is preferably 200 μm or less, more preferably 100 μm or less, though it is usually restricted by the difference in a thermal expansion coefficient between the first catalyst and the substrate. With this thickness, it is possible to prevent the exhaust gas cleaner from being broken by a thermal shock, etc. during NOx-removing operations. Incidentally, the first catalyst may be carried by the exhaust gas cleaner substrate by known methods such as a wash-coating method, etc.

The amount of the first catalyst coated onto a surface of the exhaust gas cleaner substrate is preferably 20–300 g/liter, more preferably 50–250 g/liter based on the exhaust gas cleaner substrate. When the amount of the first catalyst is less than 20 g/liter, a sufficient removal ratio of nitrogen oxides cannot be achieved. On the other hand, even when the amount of the first catalyst is more than 300 g/liter, correspondingly higher removal efficiency cannot be obtained, there is only resulting in a higher loss of pressure.

[2] Second catalyst

The second catalyst consists of silver or silver oxide and copper or copper oxide supported as catalytically active components by a porous inorganic oxide, which is disposed on the outlet side of the exhaust gas cleaner. As in the first catalyst, the preferable materials for the porous inorganic oxide include porous, heat-resistant ceramics such as γ-alumina, titania, zirconia and their composite oxides such as γ-alumina-titania, γ-alumina-silica, γ-alumina-zirconia, titania-zirconia, etc. As in the first catalyst, a specific surface area of the porous inorganic oxide is preferably 10 m$^2$/g or more, more preferably 30 m$^2$/g or more.

The catalytically active components of the second catalyst are a mixture of (a) silver or silver oxide and (b) copper or copper oxide. The amount of silver or silver oxide is 0.2–15 weight (on a metal basis) based on the porous inorganic oxide. When the amount of silver or silver oxide is less than 0.2 weight % or exceeds 15 weight %, the removal ratio of nitrogen oxides is low. The preferred amount of silver or silver oxide is 0.5–10 weight % (on a metal basis) based on the porous inorganic oxide. The amount of copper or copper oxide is 2 weight % or less (on a metal basis) based on the porous inorganic oxide. When it exceeds 2 weight %, the removal ratio of nitrogen oxides is lowered. The preferred amount of copper or copper oxide is 0.01–1.5 weight % (on a metal basis).

The total amount of the catalytically active components (a) and (b) in the second catalyst is 0.2–17 weight % (on a metal basis), preferably 0.5–15 weight % (on a metal basis) based on the porous inorganic oxide. When the total amount of the catalytically active components exceeds 17 weight %, hydrocarbons are likely to be predominantly burned, resulting in a decrease in the removal ratio of nitrogen oxides. On the other hand, when it is lower than 0.2 weight %, the removal ratio of nitrogen oxides is low in a low-temperature region.

The second catalyst may further contain at least one alkali metal element and at least one rare earth element. The alkali metal element may be Na, K or Cs, and the rare earth element may be La, Ce or Nd. A Misch metal, a mixture of two or more rare earth elements, may also be used. In a case where the alkali metal element and the rare earth element are contained in the second catalyst, the total amount of the alkali metal element and the rare earth element is preferably 2 weight % or less (on a metal basis), more preferably 0.5–1.5 weight % (on a metal basis). Further, the amount of the alkali metal element is preferably 1 weight % or less, more preferably 0.1–0.5 weight %, and the amount of the rare earth element is preferably 1 weight % or less, more preferably 0.1–0.5 weight %.

The catalytically active components of the second catalyst may be deposited onto by the porous inorganic oxide by known methods such as an impregnation method, a precipitation method, etc. In the case of the impregnation method, the porous inorganic oxide is impregnated with aqueous solutions of carbonates, nitrates, chlorides, acetates, hydroxides, etc. of elements for the catalytically active components, dried at 50°–150° C., and heated at a temperature elevating stepwise from 100° C. to 600° C. The heating may be conducted in the air or in a nitrogen or hydrogen stream as in the first catalyst. Incidentally, the catalytically active components supported on the porous inorganic oxide are expressed herein by metals per se for the sake of simplicity, though they may exist in the form of metal or oxide at an exhaust gas temperature.

The thickness of the second catalyst carried by the exhaust gas cleaner substrate is preferably 200 μm or less, more preferably 100 μm or less. The amount of the second catalyst carried by the substrate is preferably 20–300 g/liter, more preferably 50–250 g/liter based on the substrate. Incidentally, the second catalyst may be deposited onto by the exhaust gas cleaner substrate by known methods such as a wash-coating method, etc.

A weight ratio of the first catalyst to the second catalyst is 5:1 to 1:5. When the weight ratio of the first catalyst to the second catalyst is less than 1:5 (when the percentage of the first catalyst is too small), a sufficiently high removal ratio of nitrogen oxides cannot be achieved in a wide temperature range of 200°– 600° C. On the other hand, when the weight ratio is higher than 5:1 (when the percentage of the first catalyst is too large), a high removal ratio of nitrogen oxides cannot be achieved at a temperature of 400° C. or lower. Namely, a reaction of the reducing agents (hydrocarbons and/or oxygen-containing organic compounds) with nitrogen oxides does not proceed well at a relatively low temperature. The more preferred weight ratio of the first catalyst to the second catalyst is 4:1 to 1:4.

[3] Method for removing NOx by using exhaust gas cleaner (first type)

The exhaust gas cleaner is disposed in a flow path of the exhaust gas, with the first catalyst on the inlet side and the second catalyst on the outlet side.

The exhaust gas usually contains residual hydrocarbons such as ethylene, propylene, etc. to some extent. If the exhaust gas does not contain sufficient amounts of residual hydrocarbons to reduce all nitrogen oxides in the exhaust gas, hydrocarbons and/or oxygen-containing organic compounds should be introduced into the exhaust gas. A site for introducing the hydrocarbons and/or oxygen-containing organic compounds is an upstream side of the exhaust gas cleaner.

The hydrocarbons which are introduced into the exhaust gas may be gaseous or liquid in a normal state. The gaseous hydrocarbons may be alkanes, alkenes or alkynes having 2 or more carbon atoms, such as propane, propylene, acetylene, etc., and the liquid hydrocarbons may be diesel oil, cetane, heptane, kerosene, etc. The preferred oxygen-containing organic compounds are alcohols such as ethanol, butanol, etc. These hydrocarbons and/or oxygen-containing organic compounds can be introduced into the exhaust gas by a spray method, etc.

A weight ratio of the hydrocarbons and/or the oxygen-containing organic compounds introduced into the exhaust gas to nitrogen oxides existing in the exhaust gas is preferably 0.1–5. When the weight ratio is less than 0.1, the removal ratio of nitrogen oxides is low. On the other hand, when the weight ratio is more than 5, fuel efficiency is low. The weight ratio is more preferably 0.2 to 4.

The reaction of the nitrogen oxides with the hydrocarbons and/or the oxygen-containing organic compounds is efficiently carried out by controlling a catalyst ratio which means a ratio of the amount of the above-mentioned catalyst to the amount of the exhaust gas per a unit time (catalyst amount/(exhaust gas amount/unit time)). From a practical point of view, the catalyst ratio is preferably 0.006 sec.g/ml or more, more preferably 0.007 sec.g/ml or more.

The exhaust gas passing through the exhaust gas cleaner in which the hydrocarbons and/or the oxygen-containing organic compounds are reacted with the nitrogen oxides is kept at a temperature of 200°–600° C. When the temperature of the exhaust gas is lower than 200° C., a reduction reaction of the nitrogen oxides cannot be sufficiently carried out. On the other hand, when the temperature of the exhaust gas is higher than 600° C., the hydrocarbons and/or the oxygen-containing organic compounds are burned, failing to reduce the nitrogen oxides effectively. The preferred temperature of the exhaust gas is 300°–600° C.

By the method using the exhaust gas cleaner (first type), nitrogen oxides can be efficiently removed from the exhaust gas at a wide temperature range of 200°–600° C. even though the exhaust gas contains about 10% of moisture.

[B] Second type of exhaust gas cleaner and method of removing NOx, etc. by using such exhaust gas cleaner The second type of exhaust gas cleaner comprises a first catalyst comprising 0.2–15 weight % (on a metal basis) of silver or silver oxide supported on a porous inorganic oxide, a second catalyst comprising 0.2–15 weight % (on a metal basis) of silver or silver oxide and 2 weight % or less (on a metal basis) of copper or copper oxide supported on a porous inorganic oxide, and a third catalyst comprising 2 weight % or less (on a metal basis) of at least one element selected from the group consisting of Pt, Pd, Ru, Rh, Ir and Au supported on a porous inorganic oxide. The first, second and third catalysts are disposed in this order from the inlet side to the outlet side of the exhaust gas cleaner.

[1] First catalyst

The first catalyst of the second type of the exhaust gas cleaner may essentially be the same as that of the first type of the exhaust gas cleaner. Specifically, the first catalyst is silver or silver oxide supported on a porous inorganic oxide, which is disposed on the inlet side of the exhaust gas cleaner to remove mainly nitrogen oxides in a high-temperature range. The materials for the porous inorganic oxide may be the same as in the first catalyst of the first type of the exhaust gas cleaner.

As in the first catalyst of the first type of the exhaust gas cleaner, the amount of silver or silver oxide supported as a catalytically active component by the porous inorganic oxide is 0.2–15 weight % (on a metal basis), preferably 0.5–10 weight % (on a metal basis) based on the porous inorganic oxide (100 weight %).

The silver component (silver or silver oxide) is preferably in the form of fine powder having an average diameter of 10–1000 nm. The average diameter of the silver component is more preferably 10–500 nm, and most preferably 10–200 nm.

The silver component may be deposited onto by the porous inorganic oxide by the same method as in the first type of the exhaust gas cleaner. The thickness of the first catalyst carried by the exhaust gas cleaner substrate is preferably 200 μm or less, more preferably 100 μm or less.

The first catalyst may be carried by the exhaust gas cleaner substrate by known methods such as a wash-coating method, etc. The amount of the first catalyst coated onto a surface of the exhaust gas cleaner substrate is preferably 20–300 g/liter, more preferably 50–250 g/liter based on the exhaust gas cleaner substrate.

[2] Second catalyst

The second catalyst of the second type of the exhaust gas cleaner may essentially be the same as that of the first type of the exhaust gas cleaner. Specifically, the second catalyst consists of silver or silver oxide and copper or copper oxide supported as catalytically active components by a porous inorganic oxide, which is disposed downstream of the first catalyst. The materials for the porous inorganic oxide may be the same as in the second catalyst of the first type of the exhaust gas cleaner.

The amount of silver or silver oxide is 0.2–15 weight %, preferably 0.5–10 weight % (on a metal basis) based on the porous inorganic oxide. The amount of copper or copper oxide is 2 weight % or less, preferably 0.01–1.5 weight % (on a metal basis) based on the porous inorganic oxide. The total amount of the catalytically active components in the second catalyst is 0.2–17 weight %, preferably 0.5–15 weight % (on a metal basis) based on the porous inorganic oxide.

The second catalyst may further contain 1 weight % or less, preferably 0.1–0.5 weight % of at least one alkali metal element such as Na, K or Cs and 1 weight % or less, preferably 0.1–0.5 weight % of at least one rare earth element such as La, Ce or Nd. The total amount of the alkali metal element and the rare earth element may be preferably 2 weight % or less (on a metal basis), more preferably 0.5–1.5 weight % (on a metal basis).

The catalytically active components of the second catalyst may be carried by the porous inorganic oxide by the same method as in the first type of the exhaust gas cleaner.

The thickness of the second catalyst carried by the exhaust gas cleaner substrate is preferably 200 μm or less, more preferably 100 μm or less. The amount of the second catalyst carried by the substrate is preferably 20–300 g/liter, more preferably 50–250 g/liter based on the substrate.

A weight ratio of the first catalyst to the second catalyst is preferably 5:1 to 1:5, more preferably 4:1 to 1:4.

[3] Third catalyst

The third catalyst comprises at least one element selected from the group consisting of Pt, Pd, Ru, Rh, Ir and Au supported on a porous inorganic oxide, which is disposed on the outlet side of the exhaust gas cleaner (downstream of the second catalyst). The third catalyst functions to remove nitrogen oxides in a low-temperature range, and to oxidize carbon monoxide and hydrocarbons. Preferable materials for the porous inorganic oxide may be the same as in the first catalyst.

The amount of the catalytically active component of the third catalyst is preferably 2 weight % or less (on a metal basis), preferably 0.1–1.5 weight % (on a metal basis) based on the porous inorganic oxide. When the amount of the catalytically active component of the third catalyst exceeds 2 weight %, hydrocarbons are likely to be predominantly burned, resulting in a decrease in the removal ratio of nitrogen oxides.

When gold is added as a third component with or without Pt, etc., the amount of gold is 0.02–5 weight % (on a metal basis) based on the porous inorganic oxide. When the amount of gold is less than 0.02 weight %, a sufficient removal ratio of nitrogen oxides cannot be achieved. On the other hand, when it exceeds 5 weight %, hydrocarbons and/or oxygen-containing organic compounds are likely to be predominantly burned, resulting in a decrease in the removal ratio of nitrogen oxides. The preferred amount of gold is 0.02–2 weight % (on a metal basis) based on the porous inorganic oxide.

The third catalyst may further contain at least one rare earth element such as La, Ce, etc. in an amount of 10 weight % or less (on a metal basis) based on the porous inorganic oxide. With the rare earth element supported together, the third catalyst (platinum catalyst) is provided with an improved heat resistance.

The catalytically active component of the third catalyst may be deposited onto by the porous inorganic oxide by known methods such as an impregnation method, a precipitation method, etc. In the case of the impregnation method, the porous inorganic oxide is impregnated with an aqueous solution of carbonates, chlorides, nitrates, acetates, hydroxides, etc. of an element for the catalytically active component, dried at 50°–150° C., and heated at a temperature elevating stepwise from 100° C. to 700° C. Incidentally, the catalytically active component is expressed herein by metals per se for the sake of simplicity, though they may exist in the form of metal or oxide at an exhaust gas temperature.

The thickness of the third catalyst carried by the exhaust gas cleaner substrate is preferably 200 μm or less, more preferably 100 μm or less. The amount of the third catalyst carried by the substrate is preferably 20–300 g/liter, more preferably 50–250 g/liter based on the substrate. Incidentally, the third catalyst may be carried by the exhaust gas cleaner substrate by known methods such as a wash-coating method, etc.

A weight ratio of the first catalyst to the third catalyst is preferably 5:1 to 1:5. When the weight ratio of the first catalyst to the third catalyst is less than 1:5 (when the percentage of the first catalyst is too small), a sufficiently high removal ratio of nitrogen oxides cannot be achieved in a wide temperature range of 200°–600° C. On the other hand, when the weight ratio is higher than 5:1 (when the percentage of the first catalyst is too large), high removal ratios of nitrogen oxides, carbon monoxide and hydrocarbons cannot be achieved at a temperature of 400° C. or lower. The more preferred weight ratio of the first catalyst to the third catalyst is 4:1 to 1:4.

[4] Method for removing NOx by using exhaust gas cleaner (second type)

The exhaust gas cleaner is disposed in a flow path of the exhaust gas, with the first catalyst on the inlet side, the third catalyst on the outlet side and the second catalyst interposed therebetween.

The hydrocarbons and the oxygen-containing organic compounds which are introduced into the exhaust gas may be the same as in the method using exhaust gas cleaner (first type). A weight ratio of the hydrocarbons and/or oxygen-containing organic compounds introduced into the exhaust gas to nitrogen oxides existing in the exhaust gas is preferably 0.1–5, more preferably 0.2 to 4.

From a practical point of view, the catalyst ratio is preferably 0.006 sec.g/ml or more, more preferably 0.007 sec.g/ml or more.

The exhaust gas passing through the exhaust gas cleaner is kept at a temperature of 200°–600° C., preferably 300°–600° C.

By the method using the exhaust gas cleaner (second type), nitrogen oxides can be efficiently removed from the exhaust gas at a wide temperature range of 200°–600° C. even though the exhaust gas contains about 10% of moisture.

[C] Third type of exhaust gas cleaner and method of removing NOx by using such exhaust gas cleaner The third type of exhaust gas cleaner comprises a first catalyst comprising 0.2–15 weight % (on a metal basis) of silver or silver oxide having an average diameter of 10–1000 nm and supported on a porous inorganic oxide, and a third catalyst comprising 0.02–5 weight % (on a metal basis) of at least one element selected from the group consisting of Pt, Pd, Ru, Rh, Ir and Au supported on a porous inorganic oxide.

In one embodiment, the first catalyst is disposed on the inlet side of the exhaust gas cleaner, and the third catalyst is disposed on the outlet side of the exhaust gas cleaner. Also, in another embodiment, a mixture of the first catalyst and the third catalyst is used.

When Au is used together with Pt, etc., in one embodiment, the first catalyst is disposed on the inlet side of the exhaust gas cleaner, Au is disposed in an intermediate portion of the exhaust gas cleaner, and the third catalyst is disposed on the outlet side of the exhaust gas cleaner. In another embodiment, a mixture of the first catalyst, Au and the third catalyst is used.

[1] First catalyst

The first catalyst of the third type of the exhaust gas cleaner may essentially be the same as that of the first type of the exhaust gas cleaner. Specifically, the first catalyst is silver or silver oxide supported on a porous inorganic oxide for removing mainly nitrogen oxides in a high-temperature range. The materials for the porous inorganic oxide may be the same as in the first catalyst of the first type of the exhaust gas cleaner.

As in the first catalyst of the first type of the exhaust gas cleaner, the amount of silver or silver oxide supported as a catalytically active component by the porous inorganic oxide is 0.2– 15 weight % (on a metal basis), preferably 0.5–10 weight % (on a metal basis) based on the porous inorganic oxide (100 weight %).

The silver component may be deposited onto by the porous inorganic oxide by the same method as in the first type of the exhaust gas cleaner. The thickness of the first catalyst carried by the exhaust gas cleaner substrate is preferably 200 μm or less, more preferably 100 μm or less. The first catalyst may be deposited onto the exhaust gas cleaner substrate by known methods such as a wash-coating method, etc.

The silver component (silver or silver oxide) is preferably in the form of fine powder having an average diameter of 10–1000 nm. The average diameter of the silver component is more preferably 10–500 nm, and most preferably 10–200 nm.

The silver component may be deposited onto by the porous inorganic oxide by the same method as in [A] [1]. The amount of the first catalyst coated onto a surface of the exhaust gas cleaner substrate is preferably 20–300 g/liter, more preferably 50–250 g/liter based on the exhaust gas cleaner substrate.

[2] Third catalyst

The third catalyst may be the same as in the second type of the exhaust gas cleaner. Specifically, the catalytically active component of the third catalyst is at least one element selected from the group consisting of Pt, Pd, Ru, Rh, Ir and Au, and preferable combinations thereof are Pt+Rh, Pd+Rh, and Pt+Pd+Rh. The amount of the catalytically active component of the third catalyst is 0.02–5 weight % (on a metal basis), preferably 0.05–3 weight % based on the porous inorganic oxide. When gold is added as a third component with or without Pt, etc., the amount of gold is 0.02–5 weight %, preferably 0.02–2 weight % (on a metal basis) based on the porous inorganic oxide.

The third catalyst may further contain at least one alkaline earth metal element such as Ca, Mg, etc., and at least one rare earth element such as La, Ce, etc. The amount of the alkaline earth metal element is preferably 2 weight % or less, more preferably 0.01–1.5 weight %, and the amount of the rare earth element is preferably 2 weight % or less, more preferably 0.01–1.5 weight %.

The catalytically active component of the third catalyst may be deposited onto by the porous inorganic oxide by the same method as in the third catalyst of the second type of the exhaust gas cleaner.

The thickness of the third catalyst carried by the exhaust gas cleaner substrate is preferably 200 μm or less more preferably 100 μm or less. The amount of the third catalyst carried by the substrate is preferably 20–300 g/liter, more preferably 50–250 g/liter based on the substrate. Incidentally, the third catalyst may be deposited onto by the exhaust gas cleaner substrate by known methods such as a wash-coating method, etc.

A weight ratio of the first catalyst to the third catalyst is preferably 5:1 to 1:5, more preferably 4:1 to 1:4.

[3] Method for removing NOx by using exhaust gas cleaner (third type)

In one embodiment, the exhaust gas cleaner (third type) is disposed in a flow path of the exhaust gas, with the first catalyst on the inlet side and the third catalyst on the outlet side. In another embodiment, the exhaust gas cleaner comprising a mixture of the first catalyst and the second catalyst is disposed in a flow path of the exhaust gas.

The hydrocarbons or the oxygen-containing organic compounds which are introduced into the exhaust gas in this method may be the same as in the method using exhaust gas cleaner (second type). A weight ratio of the hydrocarbons or the oxygen-containing organic compounds introduced into the exhaust gas to nitrogen oxides existing in the exhaust gas is preferably 0.1–5, more preferably 0.2 to 4.

From a practical point of view, the catalyst ratio is preferably 0.006 sec.g/ml or more, more preferably 0.007 sec.g/ml or more.

The exhaust gas passing through the exhaust gas cleaner is kept at a temperature of 200°–650° C. when hydrocarbons are added, and 200°–650° C. when oxygen-containing organic compounds are added. In both cases, when the temperature of the exhaust gas is lower than the lower limit, a reduction reaction of the nitrogen oxides cannot be sufficiently carried out. On the other hand, when the temperature of the exhaust gas is higher than 650° C., the hydrocarbons or oxygen-containing organic compounds are burned, failing to reduce the nitrogen oxides effectively. The preferred temperature of the exhaust gas is 300°–600° C.

[4] Method for removing NOx from exhaust gas discharged from engines operated by liquefied petroleum gas, etc.

The third type of exhaust gas cleaner is also effective to remove nitrogen oxides from an exhaust gas discharged from engines operated by using as a fuel mixed hydrocarbons of liquefied petroleum gas, town gas or liquefied natural gas.

The third type of exhaust gas cleaner is disposed in a flow path of the exhaust gas with the first catalyst on the inlet side and the third catalyst on the outlet side, or a mixture of the first catalyst and the third catalyst is disposed in a flow path.

With respect to the first catalyst, it may be the same as described above. With respect to the third catalyst, the amount of the catalytic,ally active component (Pt, etc.) is 0.01–5 weight %, preferably 0.05–5 weight % (on a metal basis) based on the porous inorganic oxide.

The third catalyst may further contain at least one rare earth element such as La, Ce, etc. and at least one alkaline earth metal element such as Ca, Mg, Ba, etc. in a total amount of 10 weight % or less (on a metal basis) based on the porous inorganic oxide.

The hydrocarbons which are introduced into the exhaust gas are alkanes, alkenes or alkynes such as methane, ethane, propane, butane, etc. in addition to mixed hydrocarbons such as liquefied petroleum gas, town gas and liquefied natural gas. Other mixed hydrocarbons may also be used. When the mixed hydrocarbons are added, it is preferable to use those having many carbon atoms since saturated hydrocarbons having a small number of carbon atoms serve to decrease the removal ratio of NOx in a low-temperature range.

A weight ratio of the hydrocarbons introduced into the exhaust gas to nitrogen oxides existing in the exhaust gas is 5 or less, preferably 0.1–5, more preferably 0.2 to 4.

The exhaust gas passing through the exhaust gas cleaner is kept at a temperature of 200°–650° C., preferably 300°–600° C.

By the method using the exhaust gas cleaner (third type) and using the oxygen-containing organic compounds, nitrogen oxides can be efficiently removed from the exhaust gas at a wide temperature range even though the exhaust gas contains about 10% of moisture.

Though the first to third types of the exhaust gas cleaners are explained separately for the sake of avoiding confusion, it should be noted that materials and methods described with respect to a particular type of exhaust gas cleaner may be utilized for other exhaust gas cleaners unless they do not deviate from the spirit of the present invention. For instance, with respect to the details of catalysts and porous inorganic oxides, please refer to Section [A].

The present invention will be described in further detail by way of the following Examples. Incidentally, the catalytic active components are generally expressed by metals themselves for simplicity in Examples.

EXAMPLE 1

Commercially available γ-alumina pellets (diameter: 1.5 mm, length: 6 mm, specific surface area: 200 m$^2$/g) were immersed in an aqueous solution of silver nitrate to carry 2 weight % of silver, dried and then heated to 600° C. stepwise in the air to prepare a first catalyst (silver catalyst). In the same manner, γ-alumina pellets (diameter: 1.5 mm, length: 6 mm, specific surface area: 200 m²/g) were immersed in aqueous solutions of copper nitrate and silver nitrate, dried and then heated to 600° C. stepwise in the air to prepare a second catalyst (silver/copper catalyst) comprising 2 weight % of silver and 0.07 weight % of copper.

An exhaust gas cleaner consisting of 3.75 g of the first catalyst (silver catalyst) and 3.75 g of the second catalyst (silver/copper catalyst) was charged into a reactor pipe with the silver catalyst on the inlet side and the silver/copper catalyst on the outlet side.

Next, a test gas having a composition shown in Table 1 below was caused to pass through the reactor pipe at a rate of 4.4 liters per minute (in a standard state), which corresponded to an overall apparent space velocity of 15,000 h$^{-1}$ and catalyst ratios of the first and second catalysts of 0.05 sec.g/ml. The temperature of the test gas was changed from 200° C. to 600° C. in the reactor pipe to cause a reaction between nitrogen monoxide and propylene.

TABLE 1

| Component | Concentration |
| --- | --- |
| Nitrogen monoxide | 800 ppm |
| Oxygen | 10 volume % |
| Water | 10 volume % |
| Propylene | 1714 ppm |
| Nitrogen | Balance |

Figure 1:
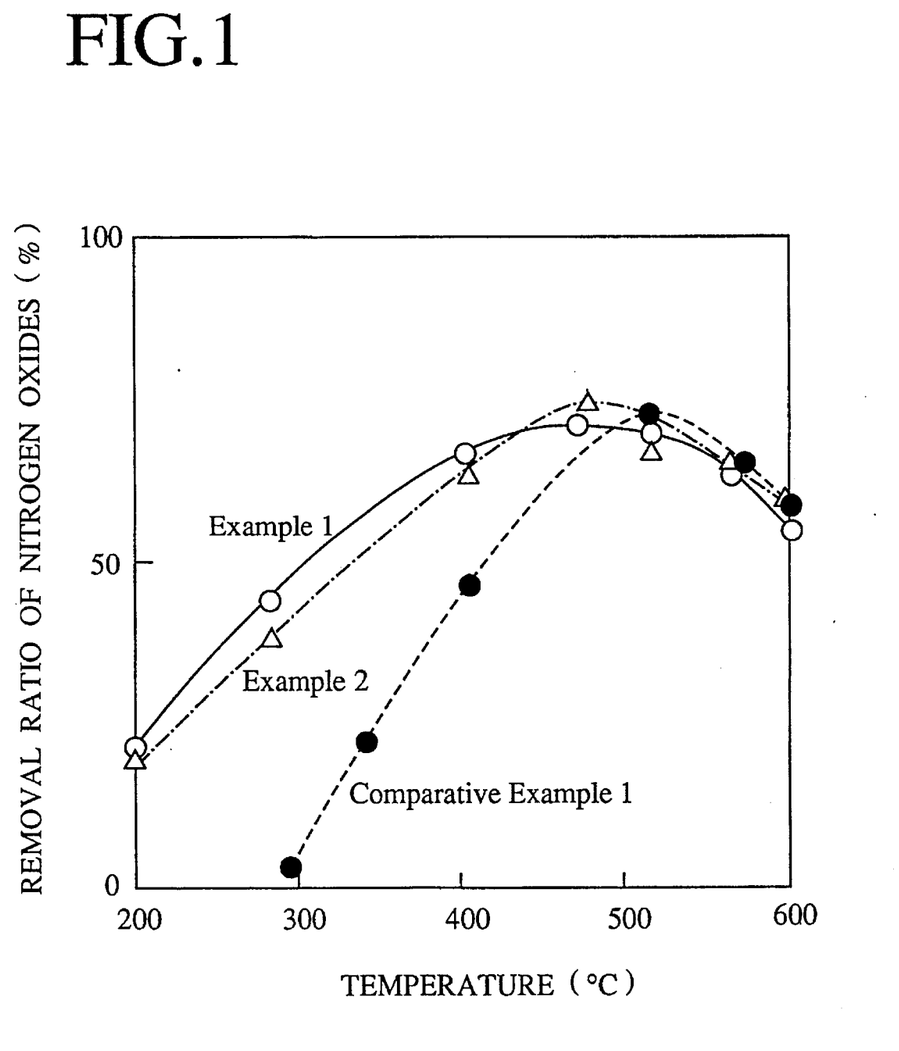
FIG. 1 is a graph showing the relation between the removal ratio of NOx and the temperature of the exhaust gas in Examples 1 and 2 and Comparative Example 1.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 1.

EXAMPLE 2

In the same manner as in Example 1, γ-alumina powder (average diameter: 40 μm, specific surface area: 200 m²/g) was immersed in an aqueous solution of silver nitrate to carry 3 weight % of silver, and 1.4 g of the resulting first catalyst (silver catalyst) was supported on a commercially available honeycomb-type cordierite filter (diameter: 30 mm, length: 12.5 mm) by a wash-coating method, dried and then heated to 600° C. to prepare an exhaust gas cleaner part carrying the silver catalyst.

In the same manner, γ-alumina powder (average diameter: 40 μm, specific surface area: 200 m²/g) was immersed in aqueous solutions of copper nitrate and silver nitrate to provide a second catalyst comprising 3 weight % of silver and 0.09 weight % of copper Supported on the γ-alumina powder, and 1.4 g of the second catalyst was supported on the same honeycomb-type cordierite filter, dried and then heated to 600° C. stepwise to prepare an exhaust gas cleaner part carrying the silver/copper catalyst.

With the silver catalyst on the inlet side and the silver/copper catalyst on the outlet side, the catalyst-carrying honeycomb-type cordierite filter was charged in a reactor pipe. Under the same conditions (overall apparent space velocity: 15,000 h.$^{-1}$) as in Example 1, tests were conducted using the test gas having a composition shown in Table 1. The results are shown in FIG. 1.

Comparative Example 1

In the same manner as in Example 1, an exhaust gas cleaner comprising γ-alumina pellets carrying 2 weight % of silver was prepared. 7.50 g of this exhaust gas cleaner was charged in a reactor pipe, and tests were conducted using the test gas having a composition shown in Table 1 under the same conditions as in Example 1. The results are shown in FIG. 1.

As is clear from FIG. 1, the exhaust gas cleaners in Examples 1 and 2 which comprise both of the silver catalyst and the silver/copper catalyst can provide a high removal ratio of nitrogen oxides in a wide temperature range of the exhaust gas. On the other hand, the exhaust gas cleaner in Comparative Example 1 which comprises only the silver catalyst fails to provide a high removal ratio of nitrogen oxides in a wide temperature range of the exhaust gas.

EXAMPLE 3

Commercially available γ-alumina pellets (diameter: 1.5 mm, length: 6 mm, specific surface area: 200 m²/g) were immersed in an aqueous solution of silver nitrate, dried and then heated to 600° C. stepwise in the air to prepare a first catalyst (silver catalyst) carrying 2 weight % of silver. In the same manner, γ-alumina pellets (diameter: 1.5 mm, length: 6 mm, specific surface area: 200 m²/g) were immersed in aqueous solutions of copper nitrate and silver nitrate, dried and then heated to 600° C. to prepare a second catalyst (silver/copper catalyst) carrying 2 weight % of silver and 0.07 weight % of copper. Further, γ-alumina pellets (diameter: 1.5 mm, length: 6 mm, specific surface area: 200 m²/g) were immersed in an aqueous solution of chloroplatinic acid, dried and then heated to 700° C. to prepare a third catalyst (platinum catalyst) carrying 0.2 weight % of Pt.

An exhaust gas cleaner consisting of 3.75 g of the first catalyst (silver catalyst), 3.75 g of the second catalyst (silver/copper catalyst) and 1.8 g of the third catalyst (platinum catalyst) was charged into a reactor pipe with the silver catalyst on the inlet side, the platinum catalyst on the outlet side and the silver/copper catalyst interposed therebetween.

Next, a test gas having a composition shown in Table 2 below was caused to pass through the reactor pipe at a rate of 4.4 liters per minute (in a standard state), which corresponded to an overall apparent space velocity of 12,000 h$^{-1}$ and catalyst ratios of the first and third catalysts of 0.05 sec.g/ml and 0.025 sec.g/ml, respectively. The temperature of the test gas was changed from 200° C. to 600° C. in the reactor pipe to cause a reaction between nitrogen monoxide and propylene.

TABLE 2

| Component | Concentration |
| --- | --- |
| Nitrogen monoxide | 800 ppm |
| Carbon monoxide | 100 ppm |
| Oxygen | 10 volume % |
| Water | 10 volume % |
| Propylene | 1714 ppm (three times the weight of nitrogen monoxide) |
| Nitrogen | Balance |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the removal ratios of carbon monoxide and hydrocarbons were determined. The results are shown in Table 3.

EXAMPLE 4

In the same manner as in Example 3, γ-alumina powder (average diameter: 40 μm, specific surface area: 200 m²/g)

was immersed in an aqueous solution of silver nitrate to carry 2 weight of silver. 1 g of the resulting first catalyst (silver catalyst) was coated onto a commercially available honeycomb-type cordierite filter (diameter: 30 mm, length: 12.6 mm, 400 cells/in$^2$) by a wash-coating method, dried and then heated to 600° C. stepwise to prepare an exhaust gas cleaner part carrying the silver catalyst.

In the same manner, γ-alumina powder (average diameter: 40 μm, specific surface area: 200 m$^2$/g) was immersed in aqueous solutions of silver nitrate and copper nitrate to provide a second catalyst comprising 2 weight % of silver and 0.07 weight % of copper supported on the γ-alumina powder, and 1 g of the second catalyst was coated onto a honeycomb-type cordierite filter (diameter: 30 mm, length: 12.6 mm, 400 cells/in$^2$), dried and then heated to 600° C. to prepare an exhaust gas cleaner part carrying the silver/copper catalyst.

Further, in the same manner, 0.5 g of γ-alumina powder (average diameter: 40 μm, specific surface area: 200 m$^2$/g) impregnated with 0.2 weight % of Pt and 0.2 weight % of Rh was coated onto a honeycomb-type cordierite filter (diameter: 30 mm, length: 6 mm, 400 cells/in$^2$), dried and then heated to 700° C. to prepare an exhaust gas cleaner part carrying the platinum/rhodium catalyst.

With the silver catalyst on the inlet side, the silver/copper catalyst in an intermediate portion and the platinum/rhodium catalyst on the outlet side, these exhaust gas cleaner parts were combined and charged in a reactor pipe. Under the same conditions (overall apparent space velocity: 12,000 h$^{-1}$) as in Example 3, tests were conducted using the test gas having the same composition as in Example 3 except for containing diesel oil in an amount three times that of nitrogen monoxide instead of propylene. The results are shown in Table 3.

Comparative Example 2

In the same manner as in Example 3, an exhaust gas cleaner composed of γ-alumina pellets carrying 2 weight % of silver was prepared. 7.50 g of this exhaust gas cleaner was charged in a reactor pipe, and tests were conducted using the test gas having a composition shown in Table 2 under the same conditions as in Example 3. The results are shown in Table 3.

TABLE 3

| Temperature (°C.) | Components Removed | Example 3 | Example 4 | Com. Ex. 1 |
|---|---|---|---|---|
| 250 | NOx | 30 | 25 | 0 |
|  | CO | 75 | 78 | 40 |
|  | HC* | 50 | 52 | 35 |
| 300 | NOx | 52 | 45 | 8 |
|  | CO | 90 | 90 | 50 |
|  | HC* | 65 | 70 | 40 |
| 400 | NOx | 67 | 57 | 47 |
|  | CO | 98 | 100 | 60 |
|  | HC* | 95 | 95 | 65 |
| 500 | NOx | 70 | 70 | 72 |
|  | CO | 100 | 100 | 70 |
|  | HC* | 100 | 100 | 75 |
| 550 | NOx | 68 | 72 | 68 |
|  | CO | 100 | 100 | 75 |
|  | HC* | 100 | 100 | 80 |

Note *: Hydrocarbon.

As is clear from Table 3, the exhaust gas cleaners in Examples 3 and 4 which comprise the first to third catalysts can provide high removal ratios of nitrogen oxides, carbon monoxide and hydrocarbon over a wide temperature range of the exhaust gas. On the other hand, the exhaust gas cleaner in Comparative Example 2 which comprises only the silver catalyst fails to provide high removal ratios of nitrogen oxides, carbon monoxide and hydrocarbons over a wide temperature range of the exhaust gas.

EXAMPLE 5

Commercially available γ-alumina pellets (diameter: 1.5 mm, length: 6 mm, specific surface area: 200 m$^2$/g) were immersed in an aqueous solution of silver nitrate, dried and then heated to 600° C. stepwise in the air to prepare a first catalyst (silver catalyst) carrying 3 weight % of fine silver or silver oxide particles having an average diameter of 45 nm. In the same manner, γ-alumina pellets (diameter: 1.5 mm, length: 6 mm, specific surface area: 200 m$^2$/g) were immersed in an aqueous solution of chloroplatinic acid, dried and then heated to 700° C. to prepare a third catalyst (platinum catalyst) carrying 3 weight % of Pt.

An exhaust gas cleaner consisting of 3.7 g of the first catalyst (silver catalyst) and 1.8 g of the third catalyst (platinum catalyst) was charged into a reactor pipe with the silver catalyst on the inlet side and the platinum catalyst on the outlet side.

Next, a test gas having a composition shown in Table 2 above was caused to pass through the reactor pipe at a rate of 4.4 liters per minute (in a standard state), which corresponded to an overall apparent space velocity of 20,000 h$^{-1}$ and catalyst ratios of the first and third catalysts of about 0.05 sec.g/ml and about 0.025 sec.g/ml, respectively. The temperature of the test gas was changed from 150° C. to 650° C. in the reactor pipe to cause a reaction between nitrogen monoxide and propylene.

Figure 2:
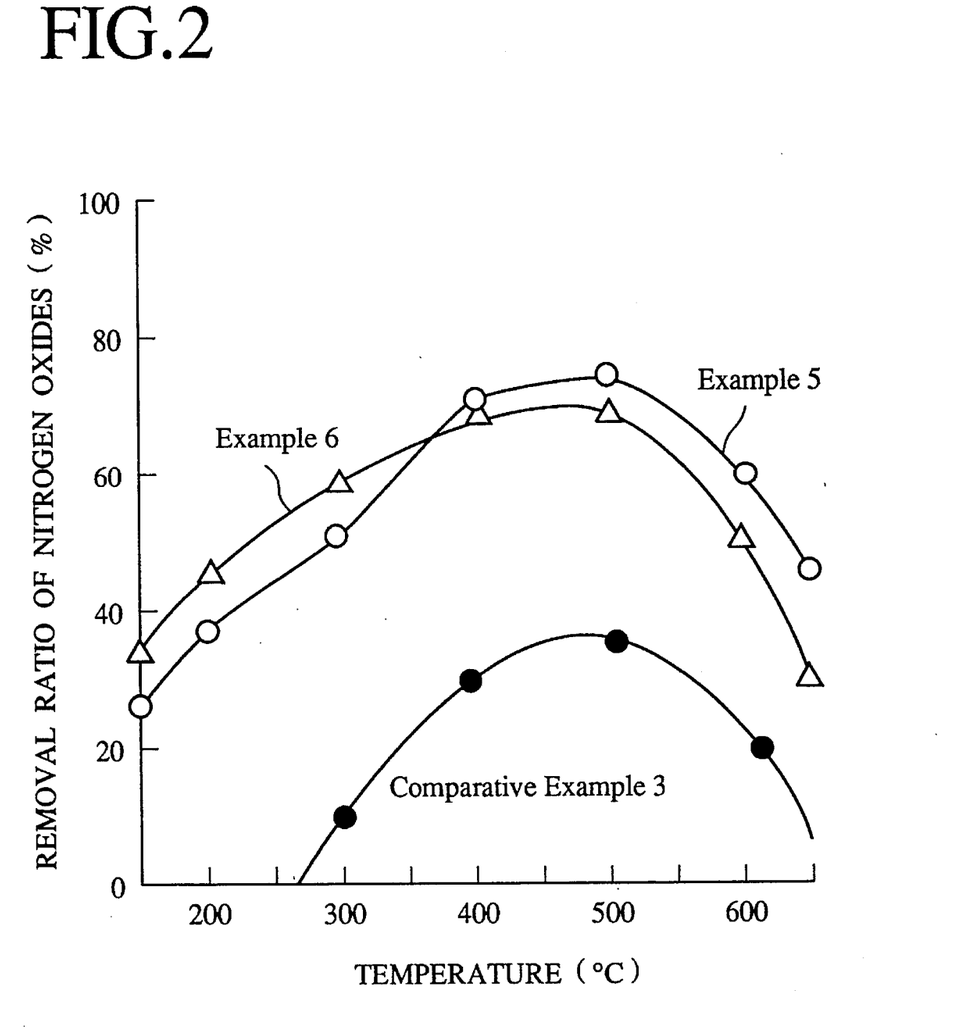
FIG. 2 is a graph showing the relation between the removal ratio of NOx and the temperature of the exhaust gas in Examples 5 and 6 and Comparative Example 3.

The concentration of nitrogen oxides (sum of nitrogen monoxide and nitrogen dioxide) in the test gas after passing through the exhaust gas cleaner was measured by a chemi-luminescence analyzer to determine the removal ratio of nitrogen oxides. The results are shown in FIG. 2.

EXAMPLE 6

In the same manner as in Example 5, γ-alumina powder (average diameter: 40 μm, specific surface area: 200 m$^2$/g) was immersed in an aqueous solution of silver nitrate to deposit thereonto 5 weight of fine silver or silver oxide particles having an average diameter of 50 nm. 1 g of the resulting first catalyst (silver catalyst) was supported on a commercially available honeycomb-type cordierite filter (diameter: 30 mm, length: 12.6 mm, 400 cells/in$^2$) by a wash-coating method, dried and then heated to 600° C. to prepare an exhaust gas cleaner part carrying the silver catalyst.

In the same manner, γ-alumina powder (average diameter: 40 μm, specific surface area: 200 m$^2$/g) was immersed in an aqueous solution of chloroplatinic acid to prepare a third catalyst (platinum catalyst) carrying 4 weight % of Pt, and 0.4 g of the third catalyst was supported on a honeycomb-type cordierite filter (diameter: 30 mm, length: 6 mm), dried and then heated to 700° C. to prepare an exhaust gas cleaner part carrying the platinum catalyst.

With the silver catalyst on the inlet side and the platinum catalyst on the outlet side, these exhaust gas cleaner parts were combined and charged in a reactor pipe. Under the same conditions (overall apparent space velocity: 20,000 h$^{-1}$) as in Example 5, tests were conducted using the test gas having the same composition as in Example 5 except for containing diesel oil in an amount three times that of nitrogen monoxide instead of propylene. The results are shown in FIG. 2.

Comparative Example 3

In the same manner as in Example 5, 5.4 g of an exhaust gas cleaner composed of γ-alumina pellets carrying 5 weight % of silver having an average diameter of 8 nm was charged in a reactor pipe, and tests were conducted using the test gas having a composition shown in Table 2 under the same conditions as in Example 5. The results are shown in FIG. 2.

As is clear from FIG. 2, the exhaust gas cleaners in Examples 5 and 6 can provide a high removal ratio of nitrogen oxides in a wide temperature range of the exhaust gas, while the exhaust gas cleaner in Comparative Example 3 fails to do so.

EXAMPLE 7

Commercially available γ-alumina pellets (diameter: 1.5 ram, length: 6 mm, specific surface area: 200 $m^2/g$) were immersed in an aqueous solution of silver nitrate, dried and then heated to 600° C. stepwise in the air to prepare a first catalyst (silver catalyst) carrying 3 weight % of fine silver or silver oxide particles having an average diameter of 45 nm. In the same manner, γ-alumina pellets (diameter: 1.5 mm, length: 6 mm, specific surface area: 200 $m^2/g$) were immersed in an aqueous solution of chloroplatinic acid, dried and then heated to 700° C. to prepare a third catalyst (platinum catalyst) carrying 3 weight % of Pt.

An exhaust gas cleaner consisting of 2.7 g of the first catalyst (silver catalyst) and 1 g of the third catalyst (platinum catalyst) was charged into a reactor pipe with the silver catalyst on the inlet side and the platinum catalyst on the outlet side.

Next, a test gas having a composition shown in Table 4 below was caused to pass through the reactor pipe at a rate of 4.4 liters per minute (in a standard state), which corresponded to an overall apparent space velocity of 30,000 $h^{-1}$ and catalyst ratios of the first and third catalysts of 0.038 sec.g/ml and 0.014 sec.g/ml, respectively. The temperature of the test gas was changed from 150° C. to 650° C. in the reactor pipe to cause a reaction between nitrogen monoxide and ethanol.

TABLE 4

| Component | Concentration |
| --- | --- |
| Nitrogen monoxide | 800 ppm |
| Carbon monoxide | 100 ppm |
| Oxygen | 10 volume % |
| Water | 10 volume % |
| Ethanol | 1600 ppm |
| Nitrogen | Balance |

Figure 3:
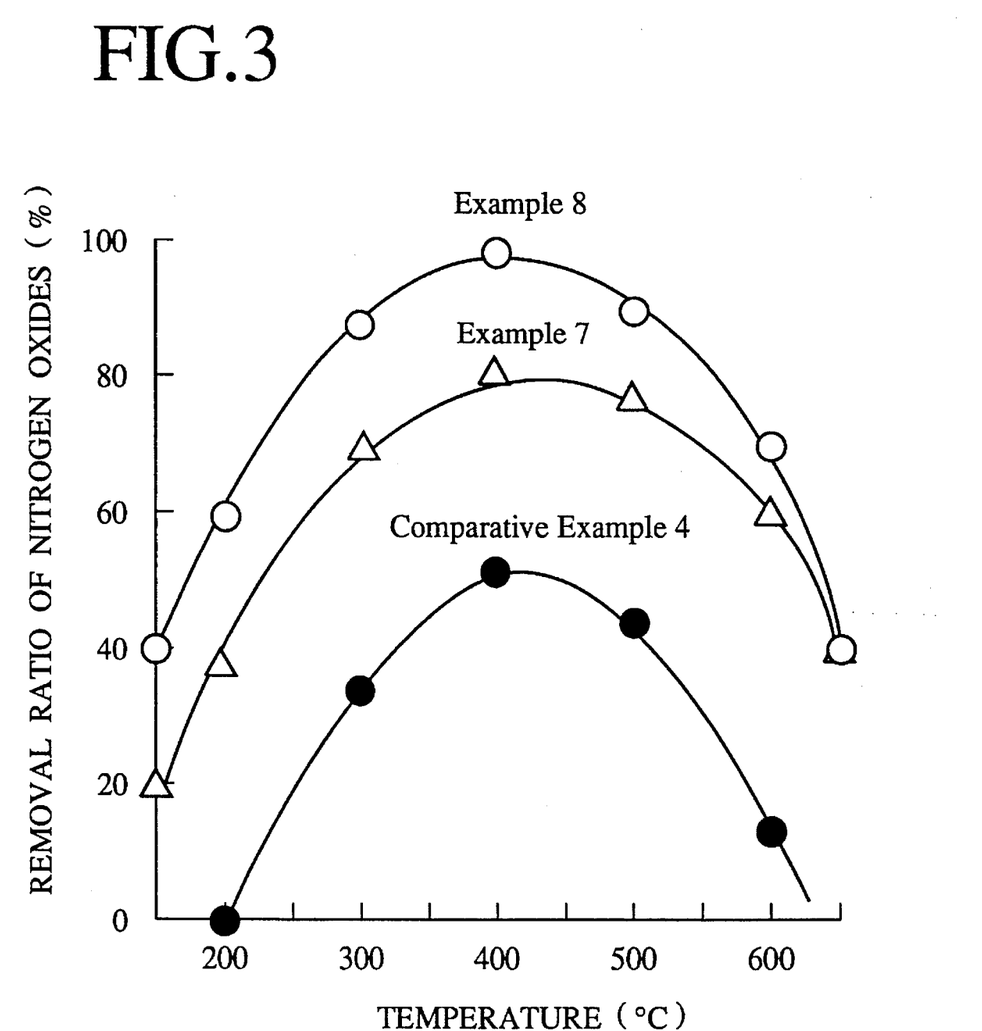
FIG. 3 is a graph showing the relation between the removal ratio of NOx and the temperature of the exhaust gas in Examples 7 and 8 and Comparative Example 4.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 3.

EXAMPLE 8

In the same manner as in Example 7, γ-alumina powder (average diameter: 40 μm, specific surface area: 200 $m^2/g$) was immersed in an aqueous solution of silver nitrate to carry 5 weight of fine silver or silver oxide particles having an average diameter of 50 nm. 1 g of the resulting first catalyst (silver catalyst) was supported on a commercially available honeycomb-type cordierite filter (diameter: 30 mm, length: 12.6 mm, 400 cells/$in^2$) by a wash-coating method, dried and then heated to 600° C. stepwise to prepare an exhaust gas cleaner part carrying the silver catalyst.

In the same manner, γ-alumina powder (average diameter: 40 μm, specific surface area: 200 $m^2/g$) was immersed in an aqueous solution of chloroplatinic acid to prepare a third catalyst (platinum catalyst), dried and then heated to 700° C. carrying 4 weight % of Pt, and 0.2 g of the third catalyst was supported on a honeycomb-type cordierite filter (diameter: 30 mm, length: 6 mm, 400 cells/$in^2$) to prepare an exhaust gas cleaner part carrying the platinum catalyst.

With the silver catalyst on the inlet side and the platinum catalyst on the outlet side, these exhaust gas cleaner parts were combined and charged in a reactor pipe. Under the same conditions (overall apparent space velocity: 30,000 $h^{-1}$) as in Example 7, tests were conducted using the test gas having a composition shown in Table 4. The results are shown in FIG. 3.

Comparative Example 4

In the same manner as in Example 7, 5.4 g of an exhaust gas cleaner composed of γ-alumina pellets carrying 5 weight % of silver having an average diameter of 2000 nm was charged in a reactor pipe and tests were conducted using the test gas having a composition shown in Table 4 under the same conditions as in Example 7. The results are shown in FIG. 3.

As is clear from FIG. 3, the exhaust gas cleaners in Examples 7 and 8 can provide a high removal ratio of nitrogen oxides in a wide temperature range of the exhaust gas, while the exhaust gas cleaner in Comparative Example 4 fails to do so.

EXAMPLE 9

Commercially available γ-alumina pellets (diameter: 1.5 mm, length: 6 mm, specific surface area: 200 $m^2/g$) were immersed in an aqueous solution of silver nitrate, dried and then heated to 600° C. stepwise in the air to prepare a first catalyst (silver catalyst) carrying 2 weight % of silver. In the same manner, commercially available titania pellets (diameter: 1.5 mm, length: 6 mm, specific surface area: 20 $m^2/g$) were immersed in an aqueous solution of chloroauric acid, dried and then heated to 700° C. to prepare a gold catalyst carrying 1 weight % of Au.

An exhaust gas cleaner consisting of a mixture of 3.7 g of the first catalyst (silver catalyst) and 1.8 g of the gold catalyst was charged into a reactor pipe.

Next, a test as having a composition shown in Table 2 above was caused to pass through the reactor pipe at a rate of 4.4 liters per minute (in a standard state), which corresponded to an overall apparent space velocity of 20,000 $h^{-1}$ and catalyst ratios of the first and fourth catalysts of 0.05 sec.g/ml and 0.025 sec.g/ml, respectively. The temperature of the test gas was changed from 200° C. to 700° C. in the reactor pipe to cause a reaction between nitrogen monoxide and propylene in the test gas.

Figure 4:
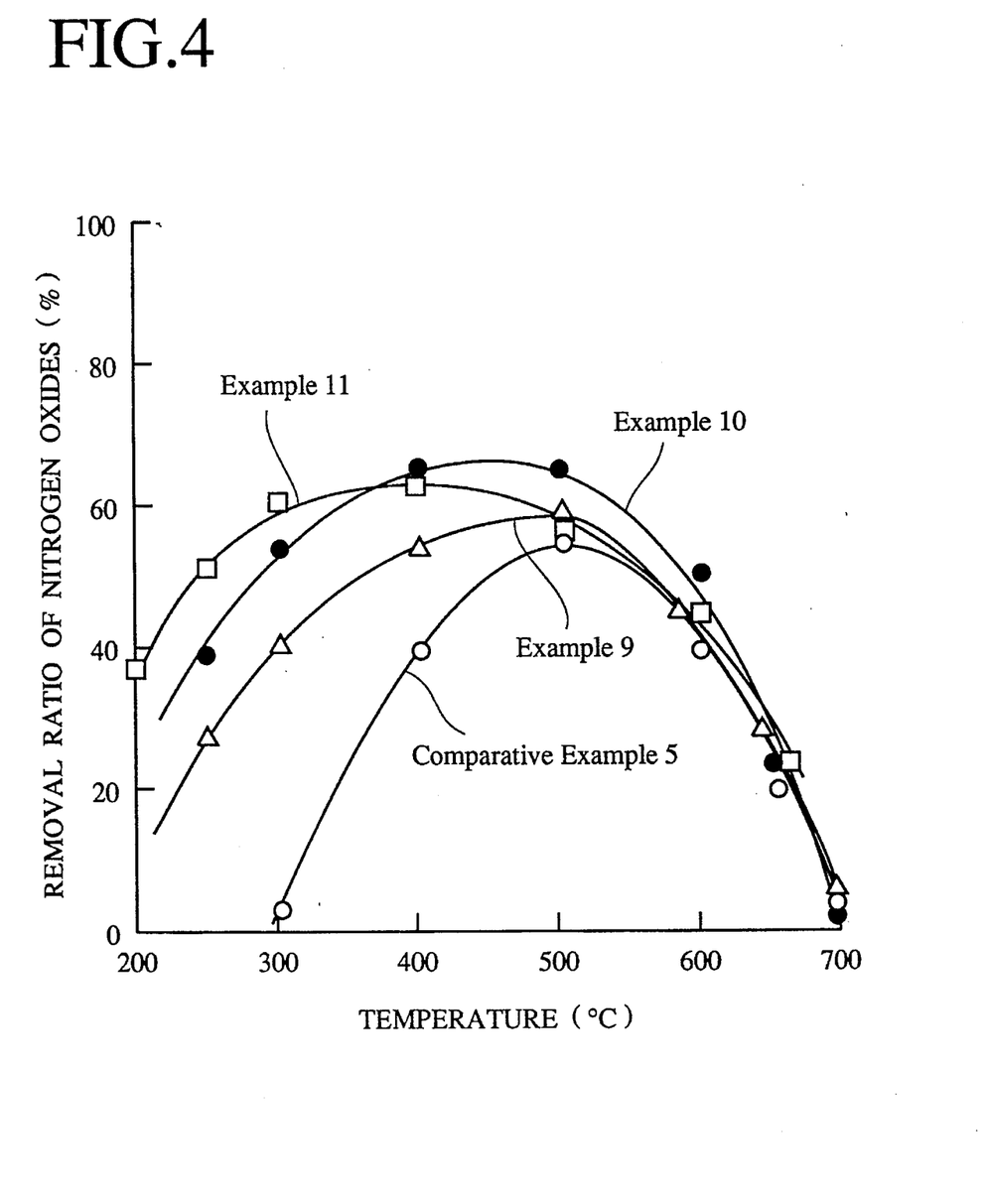
FIG. 4 is a graph showing the relation between the removal ratio of NOx and the temperature of the exhaust gas in Examples 9–11 and Comparative Example 5.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 4.

EXAMPLE 10

In the same manner as in Example 9, γ-alumina powder (specific surface area: 200 m$^2$/g) was immersed in an aqueous solution of silver nitrate to deposit thereonto carry 2 weight % of silver, and 1.0 g of the resulting first catalyst (silver catalyst) was coated onto a commercially available honeycomb-type cordierite filter (diameter: 30 mm, length: 12.6 mm, 400 cells/in:) by a wash-coating method, dried and then heated to 600° C. stepwise to prepare an exhaust gas cleaner part carrying the silver catalyst.

In the same manner, titania powder (specific surface area: 50 m$^2$/g) was immersed in an aqueous solution of chloroauric acid to provide a fourth catalyst comprising 1 weight % of gold supported on the titania powder, and 0.4 g of the gold catalyst was coated onto a honeycomb-type cordierite filter (diameter: 30 mm, length: 6 mm, 400 cells/in$^2$), dried and then heated to 700° C. to prepare an exhaust gas cleaner part carrying the gold catalyst.

With the silver catalyst on the inlet side and the gold catalyst on the outlet side, these exhaust gas cleaner parts were combined and charged in a reactor pipe. Under the same conditions (overall apparent space velocity: 20,000 h$^{-1}$) as in Example 9, tests were conducted using the test gas having a composition shown in Table 2. The results are shown in FIG. 4.

EXAMPLE 11

With the test gas having the same composition as in Example 10 except for containing diesel oil in an amount three times that of nitrogen monoxide instead of propylene, the flame tests as in Example 10 were conducted using the exhaust gas cleaner prepared in Example 10. The results are shown in FIG. 4.

Comparative Example 5

In the same manner as in Example 9, an exhaust gas cleaner composed of γ-alumina pellets carrying 2 weight % of silver was prepared. 3.6 g of this exhaust gas cleaner was charged in a reactor pipe, and tests were conducted using the test gas having a composition shown in Table 2 under the same conditions as in Example 9. The results are shown in FIG. 4.

As is clear from FIG. 4, the exhaust gas cleaners in Examples 9–11 can provide a high removal ratio of nitrogen oxides over a wide temperature range of the exhaust gas, while the exhaust gas cleaner in Comparative Example 5 fails to do so.

EXAMPLE 12

Commercially available γ-alumina pellets (diameter: 1.5 mm, length: 6 mm, specific surface area: 200 m$^2$/g) were immersed in an aqueous solution of silver nitrate, dried and then heated to 600° C. stepwise in the air to prepare a first catalyst (silver catalyst) carrying 2 weight % of silver. In the same manner, commercially available titania pellets (diameter: 1.5 mm, length: 6 mm, specific surface area: 20 m$^2$/g) were immersed in an aqueous solution of chloroauric acid, dried and then heated to 700° C. in the air to prepare a gold catalyst carrying 1 weight % of Au. Further, γ-alumina pellets (diameter: 1.5 mm, length: 6 mm, specific surface area: 200 m$^2$/g) were immersed in an aqueous solution of chloroplatinic acid, dried and then heated to 700° C. in the air to prepare a third catalyst (platinum catalyst) carrying 2 weight % of Pt.

An exhaust gas cleaner consisting of 3.7 g of the first catalyst (silver catalyst), 1.8 g of the gold catalyst and 1.8 g of the third catalyst (platinum catalyst) was charged into a reactor pipe with the silver catalyst on the inlet side, the platinum catalyst on the outlet side and the gold catalyst interposed therebetween.

Next, a test gas having a composition shown in Table 2 was caused to pass through the reactor pipe at a rate of 4.4 liters per minute (in a standard state), which corresponded to an overall apparent space velocity of 15,000 h$^{-1}$ and catalyst ratios of the first, fourth and third catalysts of 0.05 sec.g/ml, 0.025 sec.g/ml and 0.025 sec.g/ml, respectively. The temperature of the test gas was changed from 200° C. to 700° C. in the reactor pipe to cause a reaction between nitrogen monoxide and propylene in the test gas.

Figure 5:
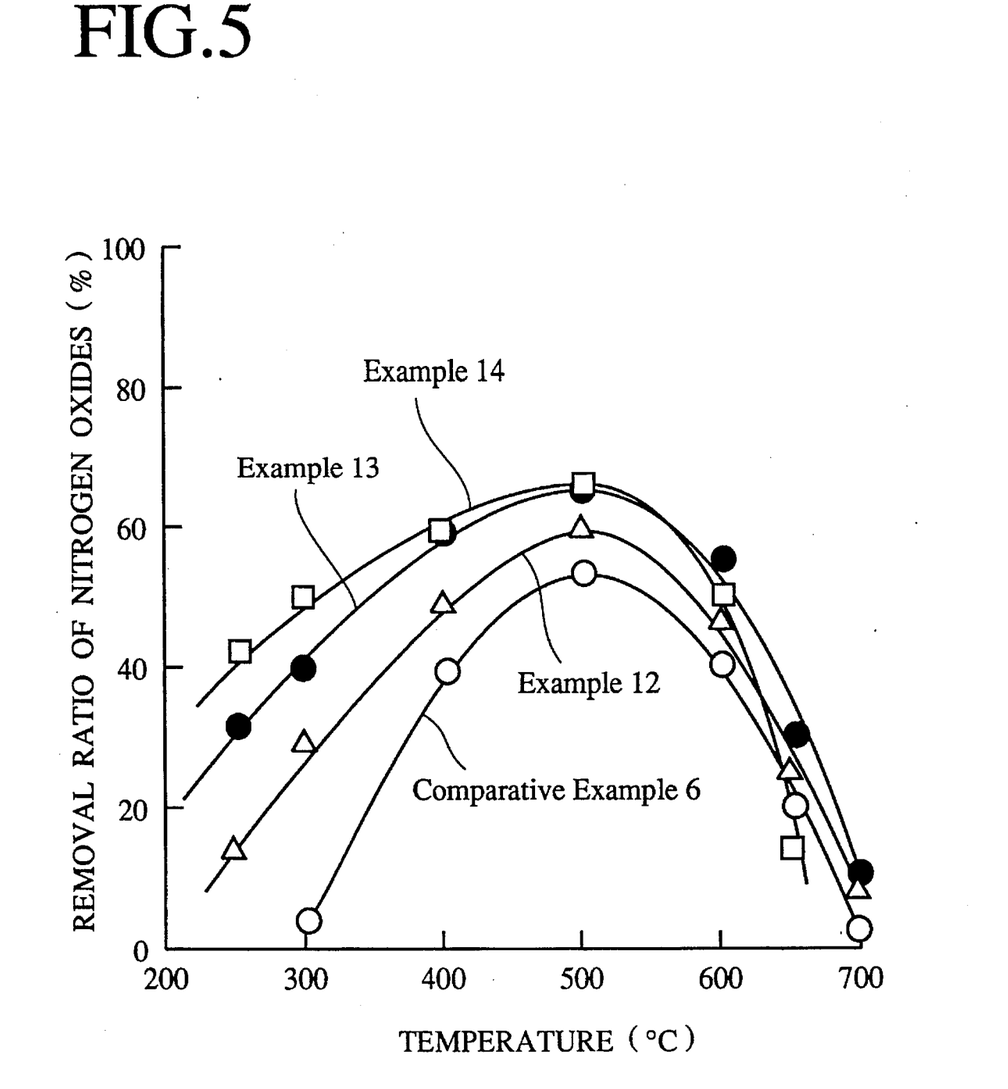
FIG. 5 is a graph showing the relation between the removal ratio of NOx and the temperature of the exhaust gas in Examples 12–14 and Comparative Example 6.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 5.

EXAMPLE 13

γ-Alumina powder (specific surface area: 200 m$^2$/g) was immersed in an aqueous solution of silver nitrate to carry 2 weight of silver, and 1 g of the resulting first catalyst (silver catalyst) was coated onto a commercially available honeycomb-type cordierite filter (diameter: 30 mm, length: 12.6 mm, 400 cells/in$^2$) by a wash-coating method, dried and then heated to 600° C. stepwise to prepare an exhaust gas cleaner part carrying the silver catalyst.

In the same manner, titania powder (specific surface area: 50 m$^2$/g) was immersed in an aqueous solution of chloroauric acid to provide a fourth catalyst comprising 1 weight % of gold supported on the titania powder, and 0.4 g of the fourth catalyst was coated onto a honeycomb-type cordierite filter (diameter: 30 mm, length: 6 mm, 400 cells/in$^2$), dried and then heated to 700° C. to prepare an exhaust gas cleaner part carrying the gold catalyst.

Further, in the same manner, 0.4 g of γ-alumina powder (specific surface area: 200 m$^2$/g) impregnated with 1 weight % of Pt was coated onto a honeycomb-type cordierite filter (diameter: 30 mm, length: 6 mm, 400 cells/in$^2$), dried and then heated to 700° C. to prepare an exhaust gas cleaner part carrying the platinum catalyst.

With the silver catalyst on the inlet side, the gold catalyst in an intermediate portion and the platinum catalyst on the outlet side, these exhaust gas cleaner parts were combined and charged in a reactor pipe. Under the same conditions (overall apparent space velocity: 15,000 h$^{-1}$) as in Example 12, tests were conducted using the test gas having a composition shown in Table 2. The results are shown in FIG. 5.

EXAMPLE 14

With the test gas having the same composition as shown in Table 2 except for containing diesel oil in an amount three times that of nitrogen monoxide instead of propylene, the same tests as in Example 13 were conducted using the exhaust gas cleaner prepared in Example 13. The results are shown in FIG. 5.

Comparative Example 6

In the same manner as in Example 12, an exhaust gas cleaner composed of γ-alumina pellets carrying 5 weight % of silver was prepared. 3.6 g of this exhaust gas cleaner was charged in a reactor pipe, and tests were conducted using the test gas having a composition shown in Table 2 under the same conditions as in Example 12. The results are shown in FIG. 5.

As is clear from FIG. 5, the exhaust gas cleaners in Examples 12–14 can provide a high removal ratio of nitrogen oxides over a wide temperature range of the exhaust gas, while the exhaust gas cleaner in Comparative Example 6 fails to do so.

EXAMPLE 15

Commercially available γ-alumina pellets (diameter: 1.5 mm, length: 6 mm, specific surface area: 200 $m^2/g$) were immersed in an aqueous solution of silver nitrate, dried and then heated from 150° C. to 200° C., 300° C., 400° C., 500° C. and then to 600° C. stepwise in the air to prepare a first catalyst (silver catalyst) carrying 5 weight of silver. In the same manner, γ-alumina pellets (diameter: 1.5 mm, length: 6 mm, specific surface area: 200 $m^2/g$) were immersed in an aqueous solution of chloroplatinic acid, dried and then heated to 700° C. to prepare a third catalyst (platinum catalyst) carrying 3 weight % of Pt. An exhaust gas cleaner consisting of a mixture of 4 g of the first catalyst (silver catalyst) and 2 g of the third catalyst (platinum catalyst) was charged into a reactor pipe with the silver catalyst on the inlet side and the platinum catalyst on the outlet side.

Next, a test gas having a composition shown in Table 5 below was caused to pass through the reactor pipe at a rate of 2.2 liters per minute (in a standard state), which corresponded to an overall apparent space velocity of 10,000 $h^{-1}$ and catalyst ratios of the first and third catalysts of 0.1 sec.g/ml and 0.05 sec.g/ml, respectively. The temperature of the test gas was changed from 200° C. to 700° C. in the reactor pipe to cause a reaction between nitrogen monoxide and liquefied petroleum gas in the test gas.

TABLE 5

| Component | Concentration |
| --- | --- |
| Nitrogen monoxide | 800 ppm |
| Oxygen | 10 volume % |
| Water | 10 volume % |
| Liquid petroleum gas | 1700 ppm |
| Nitrogen | Balance |

Figure 6:
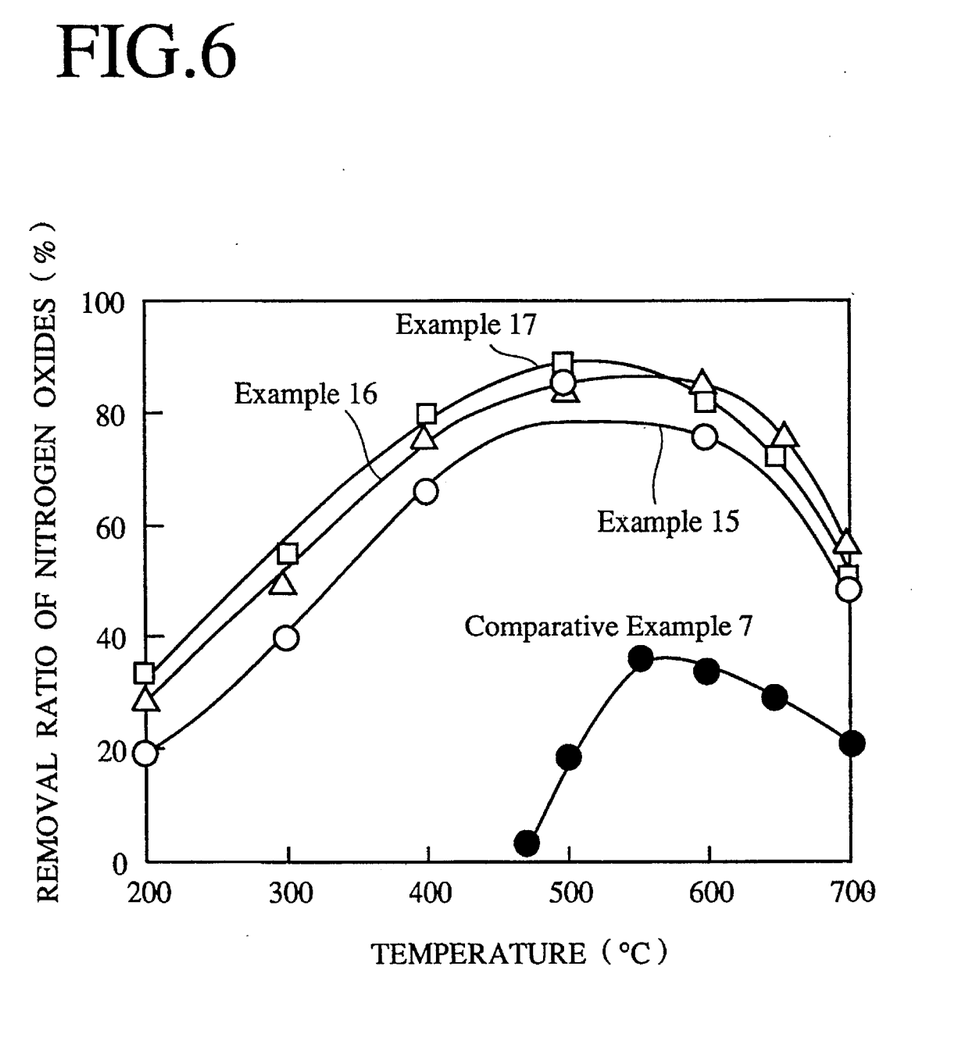
FIG. 6 is a graph showing the relation between the removal ratio of NOx and the temperature of the exhaust gas in Examples 15–17 and Comparative Example 7.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 6.

EXAMPLE 16

In the same manner as in Example 15, γ-alumina powder (average diameter: 40 μm, specific surface area: 200 $m^2/g$) was immersed in an aqueous solution of silver nitrate to deposited thereonto 5 weight % of silver, and 1 g of the resulting first catalyst (silver catalyst) was supported on a commercially available honeycomb-type cordierite filter (diameter: 30 mm, length: 12.6 mm, 400 cells/$in^2$) by a wash-coating method, dried and then heated to 600° C stepwise to prepare an exhaust gas cleaner part carrying the silver catalyst.

In the same manner, γ-alumina powder (average diameter: 40 μm, specific surface area: 200 $m^2/g$) was immersed in an aqueous solution of chloroplatinic acid to prepare a third catalyst (platinum catalyst) carrying 3 weight % of Pt, and 0.4 g of the third catalyst was supported on a honeycomb-type cordierite filter (diameter: 30 mm, length: 6 mm, 400 cells/$in^2$), dried and then heated to 700° C. to prepare an exhaust gas cleaner part carrying the platinum catalyst.

With the silver catalyst on the inlet side and the platinum catalyst on the outlet side, these exhaust gas cleaner parts were combined and charged in a reactor pipe. Under the same conditions (overall apparent space velocity: 10,000 $h^{-1}$) as in Example 15, tests were conducted using the test gas having a composition shown in Table 5. The results are shown in FIG. 6.

EXAMPLE 17

With the test gas having the same composition as in Example 16 except for containing propane in an amount three times that of nitrogen monoxide instead of liquefied petroleum gas, the same tests as in Example 16 were conducted using the exhaust gas cleaner prepared in Example 16. The results are shown in FIG. 6.

Comparative Example 7

The same γ-alumina pellets as in Example 15 were charged in a reactor pipe, and tests were conducted using the test gas having a composition shown in Table 5 under the same conditions as in Example 15. The results are shown in FIG. 6.

As is clear from FIG. 6, the exhaust gas cleaners in Examples 15–17 can provide a high removal ratio of nitrogen oxides over a wide temperature range of the exhaust gas, while the exhaust gas cleaner in Comparative Example 7 fails to do so.

As is described above in detail, by the exhaust gas cleaner according to the present invention, nitrogen oxides, and optionally carbon monoxide and hydrocarbons can be efficiently removed from the exhaust gas having an excess oxygen concentration in a wide temperature range. The exhaust gas cleaner and the method of the present invention are effective for removing nitrogen oxides, and optionally carbon monoxide and hydrocarbons from exhaust gases such as those discharged from various combustors, automobile engines, etc.

What is claimed is:

1. An exhaust gas cleaner having an inlet side and an outlet side for removing nitrogen oxides from an exhaust gas containing nitrogen oxides and oxygen in an amount larger than its stoichiometric amount relative to unburned components in said exhaust gas, which consists essentially of a first catalyst on the inlet side of said exhaust gas cleaner and a second catalyst on the outlet side of said exhaust gas cleaner, said first catalyst consisting essentially of 0.2–15 weight % of silver or silver oxide supported on a porous inorganic oxide, and said second catalyst consisting essentially of 0.2–15 weight % of silver or silver oxide and up to 2 weight % of copper or copper oxide supported on a porous inorganic oxide.

2. The exhaust gas cleaner for removing nitrogen oxides according to claim 1, wherein said exhaust gas cleaner further comprises a three-dimensional structure of ceramics or metal on which said first catalyst and said second catalyst are coated.

3. The exhaust gas cleaner for removing nitrogen oxides according to claim 1, wherein said porous inorganic oxide for supporting said first and second catalysts is in the form of pellets or granules.

4. The exhaust gas cleaner for removing nitrogen oxides according to claim 1, wherein said porous inorganic oxide is at least one ceramic selected from the group consisting of alumina, titania, zirconia and composite oxides thereof.

5. An exhaust gas cleaner having an inlet side and an outlet side for cleaning an exhaust gas containing nitrogen oxides, unburned components comprising carbon monoxide and hydrocarbons, and oxygen in an amount larger than its stoichiometric amount relative to said unburned components, by removing nitrogen oxides by reduction and carbon monoxide and hydrocarbons by oxidation from said exhaust gas, which consists essentially of first, second and third catalysts in this order from the inlet side to the outlet side of said exhaust gas cleaner, said first catalyst consisting essentially of 0.2–15 weight % of silver or silver oxide supported on a porous inorganic oxide, said second catalyst consisting essentially of 0.2–15 weight % of silver or silver oxide and up to 2 weight % of copper or copper oxide supported on a porous inorganic oxide, and said third catalyst consisting essentially of up to 2 weight % of at least one element selected from the group consisting of Pt, Pd, Ru, Rh, Ir and Au supported on a porous inorganic oxide.

6. The exhaust gas cleaner for cleaning an exhaust gas according to claim 1, wherein said exhaust gas cleaner further comprises a three-dimensional structure of ceramics or metal on which at least one of said first, second and third catalysts is coated.

7. The exhaust gas cleaner for cleaning an exhaust gas according to claim 1, wherein said porous inorganic oxide for supporting said first, second and third catalysts is in the form of pellets or granules.

8. The exhaust gas cleaner for cleaning an exhaust gas according to claim 7, wherein said porous inorganic oxide is γ-alumina or composite oxides thereof for said first and second catalysts, and at least one ceramic selected from the group consisting of alumina, titania, zirconia and composite oxides thereof for said third catalyst.

9. An exhaust gas cleaner for removing nitrogen oxides from an exhaust gas containing nitrogen oxides and oxygen in an amount larger than its stoichiometric amount relative to unburned components in said exhaust gas, which consists essentially of a first catalyst consisting essentially of 0.2–15 weight % of silver or silver oxide having an average diameter of 10–1000 nm and supported on a porous inorganic oxide, and a second catalyst consisting essentially of 0.02–5 weight % of at least one element selected from the group consisting of Pt, Pd, Ru, Rh, Ir and Au supported on porous inorganic oxide.

10. The exhaust gas cleaner for removing nitrogen oxides according to claim 9, wherein said exhaust gas cleaner further comprises a three-dimensional structure of ceramics or metal on which said first catalyst and said second catalyst are coated.

11. The exhaust gas cleaner for removing nitrogen oxides according to claim 9, wherein said porous inorganic oxide for supporting said first and second catalysts is in the form of pellets or granules.

12. The exhaust gas cleaner for removing nitrogen oxides according to claim 9, wherein said porous inorganic oxide for said first catalyst is alumina or a composite oxide thereof, and said porous inorganic oxide for said second catalyst is at least one ceramic selected from the group consisting of alumina titania, zirconia and composite oxides thereof.

* * * * *